April 4, 1939. R. PATERAS PESCARA 2,152,972

AUTO COMPRESSOR

Filed Oct. 14, 1935

Inventor:
RAUL PATERAS PESCARA
By Bailey Larson
Attorneys.

Patented Apr. 4, 1939

2,152,972

UNITED STATES PATENT OFFICE 2,152,972

AUTO COMPRESSOR

Raul Pateras Pescara, Paris, France

Application October 14, 1935, Serial No. 44,982
In France October 15, 1934

4 Claims. (Cl. 60—11)

The present invention relates to devices and apparatus for adapting the working of a uniform pressure compressed fluid generator to the working of receiving machines such as turbines.

It is known that, contrary to what takes place in steam generators, compressed fluid generators generally have the essential characteristic that their supply power can be varied practically instantaneously.

The chief object of the present invention is (the working conditions of the receiving machine, for instance a turbine, and also those of the uniform pressure compressed gas generator, being known) to devise plants of the kind above referred to, and also their accessories, in such manner that the coupling of the two kinds of machines (generator and receiving machine) permits a stable working of the plant for the different conditions of operation, under the best possible working conditions for the receiving machine.

A first feature of the present invention consists, in the case of plants including a uniform pressure and uniform feed generator (that is to say a generator supplying fluid at a uniform pressure and with a uniform rate of feed), in interposing between the generator and the receiving machine a discharge device, which may be controlled either at will or automatically by the governor of said receiving machine, said discharge device being capable of modifying the amount and the pressure of the fluid supplied to said machine as a function of the load of said machine at the same time.

Another feature of the present invention consists, in the case of plants including a uniform pressure and variable feed generator, in connecting with a single control member, which may be operable either at will (manually) or automatically by the governor of the receiving machine, two groups of organs acting, simultaneously and respectively, on the feed of the generator and the pressure of the fluid supplied to said receiving machine.

Other features of the present invention will result from the following detailed description of some specific embodiments thereof.

Preferred embodiments of the present invention will be hereinafter described, with reference to the accompanying drawing, given merely by way of example, and in which.

Figure 1:
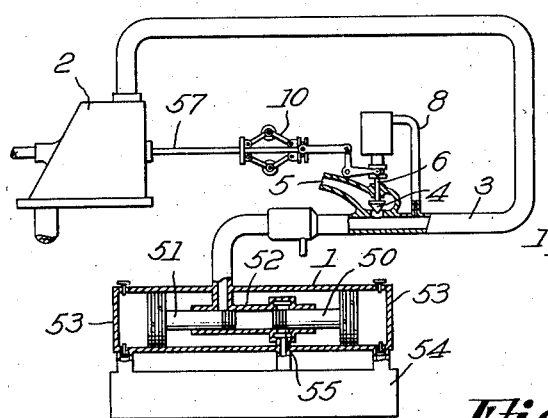
Fig. 1 is a front view of a device made according to the invention and showing the same partially in section.

As above stated, the object of the invention is to devise a plant including at least one generator having known functional characteristics adapted to feed a compressed gas to a receiving machine, for instance of the turbine type, and the functional characteristics of which are also known.

Concerning the compressed gas generator or generators, they may, for instance and advantageously, consist of generating machines of the "auto-generator" type, having freely movable pistons and feeding gas at a uniform pressure and which, as it is well known, can work either with a constant or uniform rate of feed or discharge or with a variable rate of feed. Such generators are well known per se (as shown, in my prior application, S. N. 687,236, filed August 28, 1933, now Patent No. 2,075,133, so that it is unnecessary to describe them in detail and they have been shown, in the drawing, merely by the position they occupy in the plant.

Concerning the receiving machine, it consists of at least one turbine, the rate of feed of which, as it is well known, is fully determined, for a given degree of injection, by a curve, called characteristic curve, for each value of the pressure.

Figure 2:
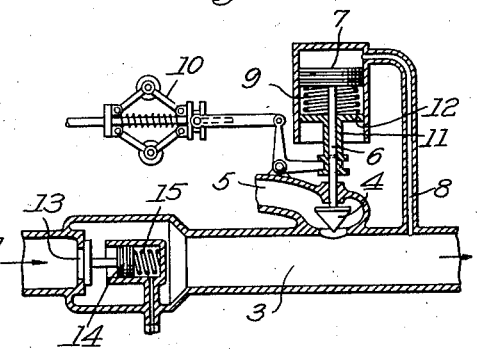
Fig. 2 is an enlarged longitudinal section of a part of the mechanism shown in Fig. 1.

In the embodiment of the invention according to Figs. 1 and 2, a generator 1, for instance a compressed air generator, of the uniform pressure and uniform rate of feed type, comprises, for example, two pistons 50 and 51 which are able to move freely in opposite directions. Each of these pistons consists of a part of smaller diameter forming the motor piston and operating in a motor cylinder 52, while the parts of larger diameter operate in compressor cylinder 53. The air compressed in compressor cylinder 53 flows into storage tank 54, and, as soon as piston 50 at its outward stroke has freed the inlet openings 55, the compressed air flows from tank 54 through said inlet openings into motor cylinder 52, flushes the combustion gases therefrom and flows with said gases to turbine 2 through a conduit 3 in which there is provided a discharge device consisting of a valve 4 of any suitable type the opening of which permits a portion of the fluid to escape through a conduit 5, opening, for instance, into the atmosphere.

This valve 4 may be operated by a rod 6 and a piston 7 which is urged, on its upper face, by the pressure existing in conduit 3 (pressure of the fluid before the turbine) owing to the provision of a connecting tube 8, and, on its under face, by the action of a spring 9, the tension of which may be modified automatically through the action of the governor 10 driven by turbine 2 through a shaft 57, owing to a sleeve 11, arranged to slide along rod 6 and carrying plate 12, against which spring 9 bears.

Figure 3:
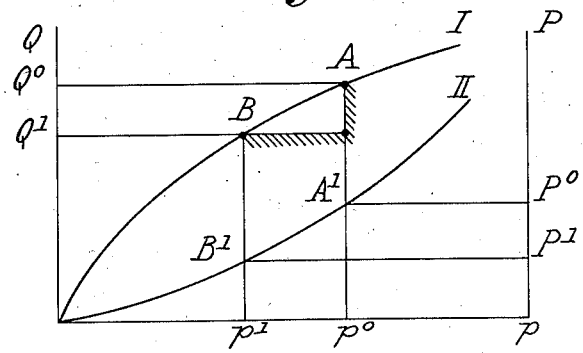
Fig. 3 shows the diagram of adjustment of the plant illustrated by Figs. 1 and 2.

In the diagram of Fig. 3, I have designated by A the point of the curve corresponding to the working under full load of the turbine (rate of feed $Q^0$, pressure $p^0$ on curve I and load $P^0$ (point $A^1$) on curve II). If the load becomes $P^1$ smaller than $P^0$ and corresponding for the turbine to a pressure $p^1$ and a rate of feed $Q^1$ (point B), generator 1 supplies too large an amount of air and at too high a pressure and the turbine tends to race. However, as governor 10 increases the tension of spring 9, valve 4 is opened just enough for ensuring a new equilibrium corresponding to power $P^1$. When this equilibrium is obtained, valve 4 is balanced under the action of the new pressure $p^1$ and of the tension of spring 9, the governor having returned to its normal position.

If, on the contrary, the turbine must be supplied with a greater amount of air, at a higher pressure, which is shown by a momentary slowing down of said turbine, governor 10 reduces the tension of spring 9, which partly or fully closes valve 4, until a new state of equilibrium is obtained.

In order to obtain a good operation of the generator, the delivery pressure of which it is desired to maintain at a normal value, I provide, for instance in conduit 3, a valve such as 13, subject on one face to the pressure in pipe 1, and automatically operated by such pressure and by a piston 14 subjected to the action of the pressure existing in pipe 3 and to the action of an opposing spring 15. If the pressure in pipe 3 drops, that in pipe 1 also tends to drop and the valve will move towards closed position. If the pressure in pipe 3 increases, that in pipe 1 will also tend to increase and the valve will move towards open position.

Figure 4:
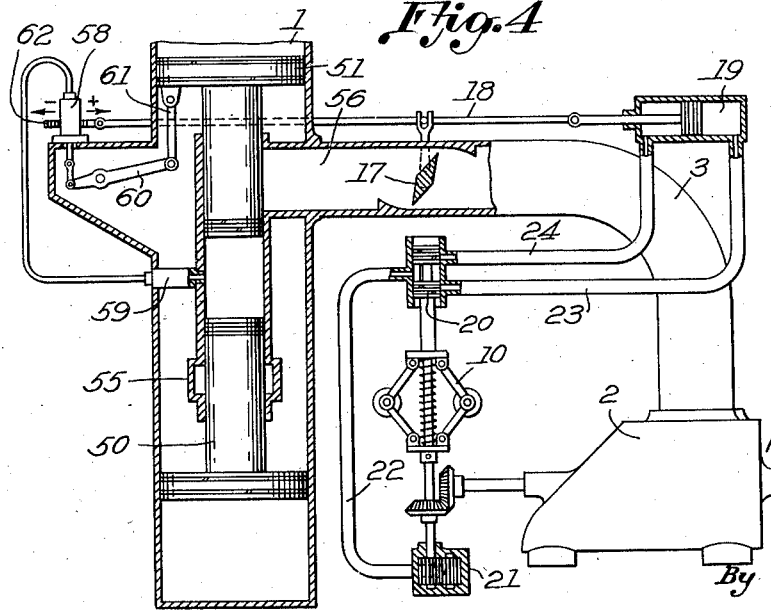
Fig. 4 is an elevational view, partly in section, of a plant devised according to the present invention and including a uniform pressure and variable feed generator and also a turbine.

If it is desired to vary the rate of feed of motor-generator 1 by acting, for instance, on the quantitative adjustment of the fuel injection, I pass from the working corresponding to point A (Fig. 3) to working with a lower power, for instance under conditions corresponding to point B, by acting, on the one hand, on the rate of feed of generator 1 which is adjusted, for instance as shown in Fig. 4, by providing a fuel injection which corresponds with the requirement of the turbine and, on the other hand, on the pressure at which compressed air is fed to the turbine by withdrawing the fluid ahead of said turbine.

According to the present invention, the adjustment organs are automatically associated in such manner that a reduction of the rate of feed corresponds to a reduction of the pressure which ensures a good working of the turbine, and this whatever be the power to be supplied.

In Fig. 4, the generator 1 likewise comprises two pistons 50, 51 moving in opposite directions. A fuel injection pump 58 which transports the fuel to an injector 59, is actuated by a pivoting lever 60 which is driven by piston 51 through a link 61. A valve 17 which, according to its position, determines the throttling of the fluid, and a rack 62 which controls the fuel pump 58 in a known manner, are both actuated by the same rod 18 which is itself subjected to the action of governor 10, for instance through a relay 19 actuated by oil under pressure, the distributing device, or slide-valve 20 of this relay being controlled directly by governor 10. The oil under pressure for operating this relay is fed from a pump 21, driven for instance by turbine 2.

If the load of the turbine decreases, the latter tends to race and the governor, by displacing slide valve 20, bring conduits 22 and 23 into communication with each other. Oil under pressure then acts on the right hand side face of the piston of relay 19 and pushes toward the left hand side of the figure said piston and rod 18, with which it is rigid. As a consequence, on the one hand, the amount of fuel that is injected is reduced and, on the other hand, valve 17 is more closed, thus producing a more important drop of pressure.

An increase in the load of the turbine has a reverse effect due to the fact that the turbine is momentarily slowed down. Slide valve 20 is then urged in the opposite direction by governor 10 and oil, flowing from conduit 23 into conduit 24, acts upon the other face of the piston of relay 19.

As soon as, due to the balancing of the motive and resisting powers, the turbine has again assumed normal conditions of working, distributing device 20 stops any connection between pump 21 and relay 19 so that members 16 and 17 remain in the positions they occupy.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the accompanying claims.

What I claim is:

1. In an apparatus comprising a variable load power unit and a free moving piston type of internal combustion motor-compressor for supplying a driving fluid to the power unit and having a passage connecting the motor-compressor and the power unit for conducting the driving fluid from the motor-compressor to the power unit, a throttle device in said passage to maintain the pressure prevailing on the compressor side thereof at least approximately constant, while the pressure prevailing on the power unit side varies according to the load on the power unit, a governor driven by said power unit, and means controlled by said governor to regulate the quantity of driving fluid passing to the power unit.

2. Arrangement according to claim 1, in which said regulating means comprises an outlet valve arranged in the driving fluid passage between the compressor and the power unit and located on the power unit side of the throttle device, and a piston connected to said valve, said piston being subjected on the one hand to the pressure of the fluid in the passage on the power unit side of the throttle device and on the other hand to the action of a spring, and means controlled by the governor to vary the tension of said spring.

3. In an apparatus comprising a variable load power unit and a free moving piston type of internal combustion motor-compressor for supplying a driving fluid to the power unit and having a passage connecting the motor-compressor and the power unit for conducting the driving fluid from the motor compressor to the power unit, a throttle device in said passage to maintain the pressure prevailing on the compressor side thereof at least approximately constant, while the pressure prevailing on the power unit side varies according to the load on the power unit, a governor driven by said power unit, means for connecting said governor to said throttle device and means controlled by said governor to regulate the amount of fuel injected to said motor compressor for regulating the quantity of driving fluid passing to the power unit.

4. In an apparatus comprising a variable load power unit and a free moving piston type of internal combustion motor-compressor for supplying a driving fluid to the power unit and having a passage connecting the motor-compressor and the power unit for conducting the driving fluid from the motor-compressor to the power unit, automatic means in said passage to diminish the pressure variations on the compressor side of said throttle device with respect to variations in pressure prevailing on the power unit side caused by load variations on the power unit, a governor driven by said power unit, and means controlled by said governor to regulate the quantity of driving fluid passing to the power unit.

RAUL PATERAS PESCARA.